United States Patent
Kwak (10) Patent No.: US 8,060,161 B2
(45) Date of Patent: Nov. 15, 2011

(54) PORTABLE ELECTRONIC DEVICE AND METHOD FOR SELECTING OPERATION MODE THEREOF

(75) Inventor: Jae-Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 1184 days.

(21) Appl. No.: 11/764,699

(22) Filed: Jun. 18, 2007

(65) Prior Publication Data

US 2008/0146298 A1 Jun. 19, 2008

(30) Foreign Application Priority Data

Dec. 15, 2006 (KR) .................. 10-2006-0128881

(51) Int. Cl.
*H04M 1/00* (2006.01)
(52) U.S. Cl. ............... 455/575.4; 345/173; 345/168; 345/158; 705/40; 455/574; 455/575.1
(58) Field of Classification Search ........... 455/400, 455/575, 574; 396/428, 429; 372/18, 97, 372/50.11, 23, 25, 50, 11; 345/173, 168, 345/158; 705/40
See application file for complete search history.

(56) References Cited

U.S. PATENT DOCUMENTS

| | | | | |
|---|---|---|---|---|
| 6,343,519 B1 * | 2/2002 | Callicott et al. | ............. | 73/865.7 |
| 7,274,424 B1 * | 9/2007 | Kurihara et al. | ............. | 349/155 |
| 7,363,065 B2 * | 4/2008 | Lee | ............. | 455/575.3 |
| 2003/0038786 A1 * | 2/2003 | Nguyen et al. | ............. | 345/169 |
| 2004/0198477 A1 * | 10/2004 | Jung et al. | ............. | 455/575.4 |
| 2004/0259591 A1 * | 12/2004 | Grams et al. | ............. | 455/556.1 |
| 2004/0263484 A1 * | 12/2004 | Mantysalo et al. | ............. | 345/173 |
| 2005/0012723 A1 * | 1/2005 | Pallakoff | ............. | 345/173 |
| 2005/0032557 A1 * | 2/2005 | Brunstrom et al. | ............. | 455/575.1 |
| 2005/0068304 A1 * | 3/2005 | Lewis et al. | ............. | 345/168 |
| 2005/0104857 A1 * | 5/2005 | Jacobs et al. | ............. | 345/169 |
| 2005/0233780 A1 * | 10/2005 | Jani et al. | ............. | 455/574 |
| 2006/0063569 A1 * | 3/2006 | Jacobs et al. | ............. | 455/575.1 |
| 2006/0227500 A1 * | 10/2006 | Brandenberg et al. | ............. | 361/683 |
| 2006/0250372 A1 * | 11/2006 | Lii | ............. | 345/173 |
| 2007/0070050 A1 * | 3/2007 | Westerman et al. | ............. | 345/173 |
| 2007/0217132 A1 * | 9/2007 | Collins | ............. | 361/681 |

FOREIGN PATENT DOCUMENTS

KR 10-2004-0098979 A 11/2004

* cited by examiner

*Primary Examiner* — Nick Corsaro
*Assistant Examiner* — Mahendra Patel
(74) *Attorney, Agent, or Firm* — Birch, Stewart, Kolasch & Birch, LLP (57) ABSTRACT

A portable electronic device includes: first and second bodies connected to be relatively movable; a position sensing unit configured to sense at least one relative position set between opened and closed positions of the first and second bodies; and an output unit mounted on at least one of the first and second bodies and outputting an operation mode corresponding to the sensed relative position. A desired operation mode can be selected easily when the mobile terminal is moved to be opened and closed.

6 Claims, 9 Drawing Sheets

FIG. 8B

PORTABLE ELECTRONIC DEVICE AND METHOD FOR SELECTING OPERATION MODE THEREOF

RELATED APPLICATION

The present disclosure relates to a subject matter contained in priority Korean Application No. 10-2006-0128881, filed on Dec. 15, 2006, which is herein expressly incorporated by reference in its entirety.

BACKGROUND OF THE INVENTION

1. Field of the Invention

The present invention relates to a portable electronic device and, more particularly, to a portable electronic device that has two or more bodies connected to be relatively movable each other and a method for selecting its operation mode.

2. Description of the Related Art

In general, the portable electronic device has a size that can be easily carried around by a user and provides certain functions to users upon being controlled electrically. An example of the portable electronic device will now be described with reference to FIGS. 1A and 1B.

Figure 1A:
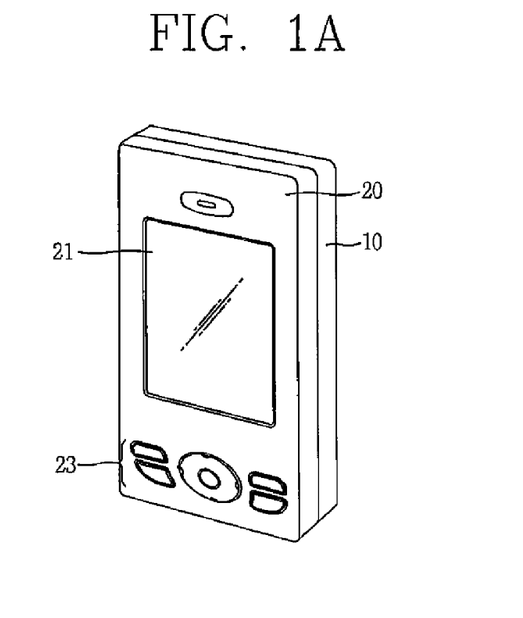
FIGS. 1A and 1B are perspective views for explaining an opened and closed state of the related art mobile terminal respectively.
Figure 1B:
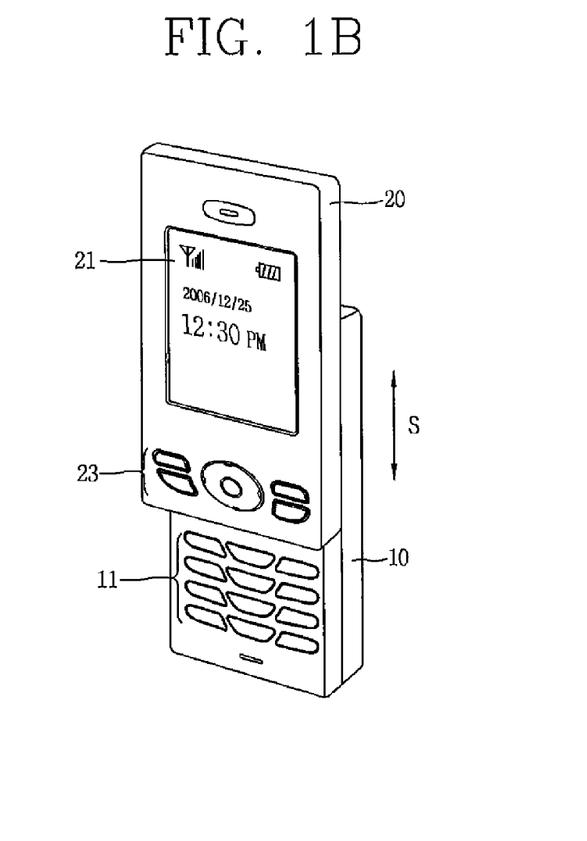

FIGS. 1A and 1B show the related art slide type mobile terminal. Of the mobile terminal, first and second bodies 10 and 20 are connected to be slidable each other along a sliding direction S. General keys 11 for inputting numbers and characters are arranged on the first body 10, while a display 21 that outputs visual information such as time information and function keys 23 that receive an input for executing a particular function are arranged on the second body 20. A microphone and a speaker are not shown.

The first and second bodies 10 and 20 relatively move in the closed state or in a power saving mode (namely, in the state as shown in FIG. 1A) and in an opened state or in a standby mode (namely, in the state as shown in FIG. 1B).

In the power saving mode, the display 21 does not display any information, and when the mobile terminal is changed to the standby mode, the display 21 outputs or displays simple information such as time. In the standby mode state, the user may make a call by manipulating the general keys 11 or select a different operation mode, e.g., a text transmission mode or an image capture mode, by manipulating the function keys 23.

According to the mode selecting method, the user should change the mobile terminal from the closed state to the opened state and then select a desired operation mode from the entire menu by manipulating the function keys 23 several times. This operation mode selecting method causes user inconvenience in using the mobile terminal.

Therefore, alternatively, a hot key method is employed in which when some of the function keys 23 are manipulated one time, a corresponding operation mode is executed or outputted (displayed) on the display 21.

However, in the hot key method, a key should be allocated to every operation mode, so the number of function keys 23 increases proportionally. The increase in the number of keys makes the exterior of the portable electronic device complicate and leads to an increase in the overall size of the portable electronic device.

SUMMARY OF THE INVENTION

Therefore, in order to address the above matters the various features described herein have been conceived. One aspect of the exemplary embodiments is to provide a portable electronic device capable of simply outputting and/or executing a particular operation mode among a plurality of operation modes, and its operation mode selecting method.

Another aspect of the exemplary embodiments is to provide a portable electronic device capable of minimizing the number of keys by reducing the number of function keys for selecting operation modes.

This specification provides a portable electronic device that may include first and second bodies, a position sensing unit and an output unit.

The first and second bodies are operatively connected (attached) to be relatively movable between a closed position and an opened position. The position sensing unit is configured to sense a relative position according to a relative is movement of the first and second bodies with respect to each other. At least one or more relative positions to be sensed by the position sensing unit can be set between the closed position and the opened position. The output unit can be mounted on at least one of the first and second bodies in order to output an operation mode of the portable electronic device corresponding to each of the at least one relative position. The operation mode may include a standby mode, a power saving mode, a music play mode, an image capture mode, and a text transmission mode, etc. The operation mode outputted to the output unit can be executed according to a user command through the input unit.

The portable electronic device that may further include a control unit. The control unit can handle a function of immediately executing the operation mode corresponding to the relative positions without inputting of a command by a user. The executed operation mode is displayed through a display.

This specification also provides a portable electronic device that may include: first and second bodies, a movement sensing unit, an input unit and an output unit. The movement sensing unit can be configured to sense a relative movement of the first and second bodies with respect to each other. The input unit may include a plurality of input parts in order to receive a plurality of commands. When a command or a plurality of commands is(are) inputted simultaneously with the movement, a operation mode corresponding to the command(s) is executed and outputted.

The specification also provides an operation mode selecting method that may include: a sensing step, an output step and an execution step. In the sensing step, at least one or more relative positions between closed and opened positions of the first and second bodies are sensed. An operation mode is outputted according to a relative position between the first and second bodies, and the outputted operation mode is executed by a user command or a pre-set program. In the executing method of the latter, an operation mode outputted by longer than a certain time can be executed, or an operation mode outputted before a movement speed increases can be employed.

The specification also provides an operation mode selecting method that may include: an input step; a sensing step; and an output step. Upon receiving a command by a user input, when a relative movement is made between first and second bodies of a terminal, the terminal executes an operation mode corresponding to the command and the movement among a plurality of operation modes and outputs it.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A portable electronic device and an operation mode selecting method according to exemplary embodiments of the present invention will now be described in detail with reference to the accompanying drawings.

Figure 2:
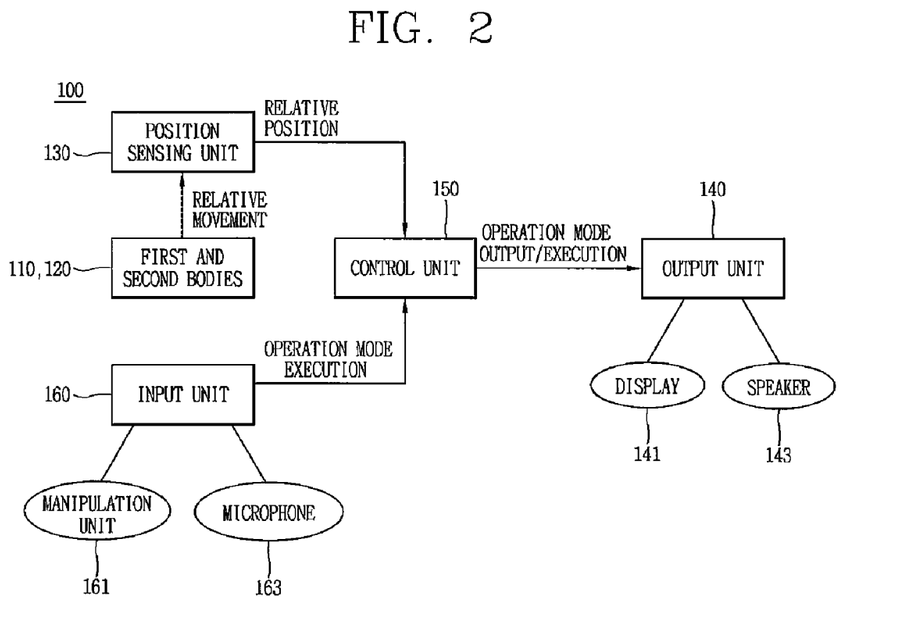
FIG. 2 is a conceptual view for explaining the construction of a portable is electronic device according to a first exemplary embodiment of the present invention.
Figure 3:
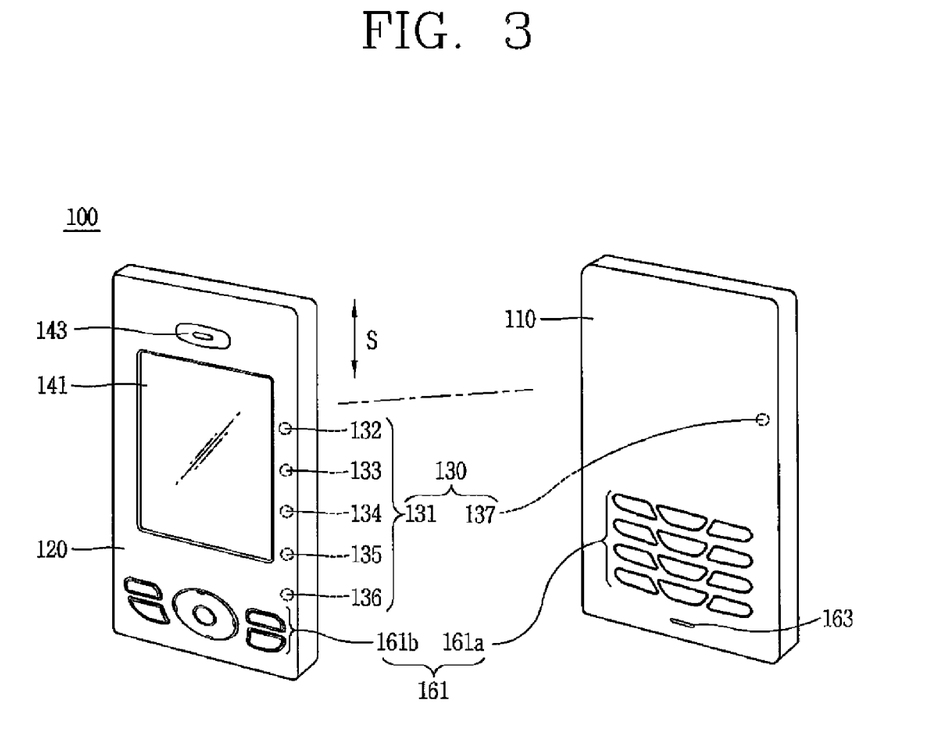
FIG. 3 is an exploded perspective view of the portable electronic device of FIG. 2.

FIG. 2 is a conceptual view for explaining the construction of a portable electronic device according to a first exemplary embodiment of the present invention, and FIG. 3 is an exploded perspective view of the portable electronic device of FIG. 2.

The portable electronic device 100 is a slide type mobile terminal that includes first and second bodies 110 and 120 which are slidably connected and a wireless communication module (not shown) that performs a wireless communication function. The mobile terminal is taken as an example of the portable electronic device 100 and the present invention is not limited thereto. The portable electronic device can be PDAs, a mobile game player, a mobile music player, a mobile calculator, etc, so long as they include two bodies that are connected to be relatively movable with respect to each other.

With reference to FIGS. 2 and 3, in order to sense a relative position between the first and second bodies 110 and 120 according to the sliding operation, a position sensing unit 130 is installed in the first and second bodies 110 and 120.

The position sensing unit 130 includes position indication element 131 that indicate a plurality of positions and a position recognizing unit 137 that senses the position indication elements 131. The position indication element 131 includes multiple, specifically, three or more, indication elements arranged at certain intervals along a sliding direction S (or a lengthwise direction) in the second body 120. The indication elements can be magnets. The position recognizing unit 137 is a sensor disposed corresponding to the position indication element 131 in the first body 110, and can be a magnetic sensor that senses, for example, the magnets.

As shown in FIG. 3, the position indication element 131 includes five magnets serving as the first to fifth position indication elements 132 to 136. The position recognizing unit 137 recognizes the five relative positions between the first and second bodies 10 and 20 when the second body 120 is slidably moved with respect to the first body 110. Herein, the first and fifth position indication is elements 132 and 136 serve to recognize a closed state and an opened state, respectively.

A relative position between the first and second bodies 110 and 120 sensed by the position sensing unit 130 is inputted to the control unit 150. Then, the control unit 150 outputs a particular operation mode corresponding to the sensed relative position to the output unit 140. The operation mode may include, for example, a power saving mode, a standby mode, an image capture mode, a music play mode, a text transmission mode, etc. The operation mode is outputted visually or audibly through the display 141 or the speaker 143, respectively. The display 141 is disposed at an upper portion of the front surface of the second body 120, and the speaker 143 is disposed at an upper side of the display 141.

A command for executing a particular operation mode outputted by the output unit 140 may be inputted from a user through the input unit 160. The input unit 160 includes a manipulation unit 161 and a microphone 163. The manipulation unit 161 can be a keypad (key button) or a touch pad that receives a command by user's pushing or touching. As an example of the manipulation unit 161, general keys 161a for receiving a command regarding numbers and characters are disposed on the front surface of the first body 110 and function keys 161b are disposed on the front surface of the second body 120.

Unlike the case where the outputted operation mode is executed by a command inputted by the input unit 160, the control unit 150 can execute an operation mode corresponding to a relative position of the first and second bodies 110 and 120 without the user's command when pre-set conditions are satisfied.

The operation method of the portable electronic device according to the first exemplary embodiment of the present invention will now be described with reference to FIGS. 2 to 4E.

FIG. 4A to 4E are front views showing five operation modes outputted or executed on a display according to five position indication elements of FIG. 3.

Figure 4A:
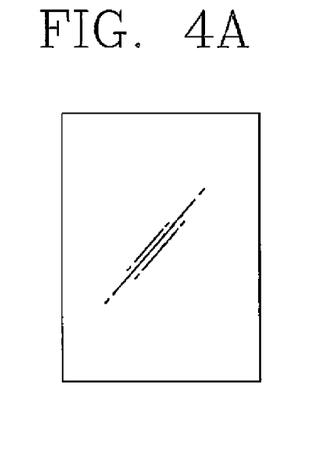
FIGS. 4A to 4E are front views showing five operation modes outputted or executed on a display according to five position indication elements of FIG. 3.

As for the portable electronic device 100, it may be assumed that the first and second bodies 110 and 120 are initially in a closed state. Namely, the first position indication element 132 is in a state of being recognized by the position recognizing unit 137. From the viewpoint of the first and second bodies 10 and 20, this deposition state can be referred to as a first position. As shown in FIG. 4A, the portable electronic device 100 is operated in the power saving mode in which power supply to the display unit 141 or the like is cut off in the first position.

Figure 4B:
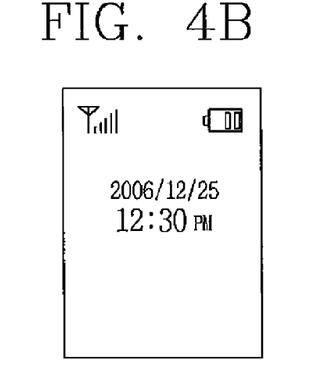

When the user completely slides the second body 120 in a sliding direction S with respect to the first body 110, the fifth position indication element 136 is sensed by the position recognizing unit 137. This disposition state is the fifth position between the first and second bodies 110 and 120. At the fifth position, the display 141 displays that the portable electronic device 100 is in a standby state for receiving a phone number, etc., from the user as shown in FIG. 4B.

Figure 4C:
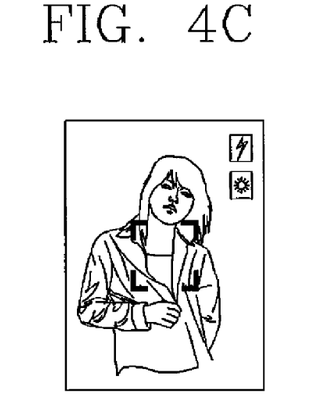

When the user slides the second body 120 slightly in the sliding direction S with respect to the first body 110 at the first position, the second position indication element 133 is sensed by the position recognizing unit 137. This disposition state is the second position between the first and second bodies 110 and 120. At the second position, an initial screen image of a single operation mode, e.g., the image capture mode, is outputted on the display 141 or the image capture mode as shown in FIG. 4C is outputted as being executed.

When the image capture mode in which the initial screen image is outputted is executed according to a user command inputted through the input unit 160 or directly executed by the control unit 150, recognizing of the third to fifth position indication elements 134 to 136 by the position recognizing unit 137 when the user slides the second body 120 at the remaining sliding interval is disregarded by the control unit 150.

Herein, it can be programmed such that when the relative movement between the first and second bodies 110 and 120 is stopped at the second position during a pre-set certain time, the control unit 150 executes the image capture mode corresponding to the second position. In a different manner, it can be programmed such that when a sliding speed between the first and second bodies 110 and 120 increases suddenly after the second position, the control unit 150 executes the image capture mode corresponding to the second position. This case refers to a case that the user slowly slides the second body in order to search an operation mode, and when the user determines to execute the image capture mode, he/she rapidly slides the second body 120 at the remaining interval to make the terminal 100 to be in a opened state.

Figure 4D:
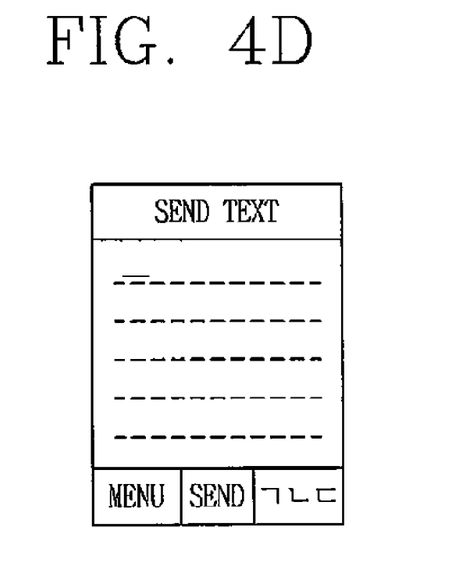

When conditions for executing the operation modes according to the two types of methods are not met and the user additionally slides the second body 120, the control unit 150 outputs an initial screen image of an operation mode corresponding to a third position, e.g., the text transmission mode, on the display 141. The third position refers to a disposition state between the first and second bodies 110 and 120 when the third position indication element 134 is recognized by the position recognizing unit 137. The text transmission mode as shown in FIG. 4D is displayed on the display 141 according to an execution command by the user or the control unit 150.

Figure 4E:
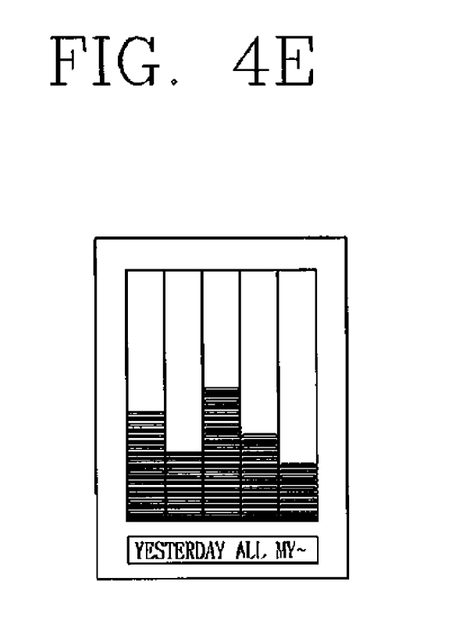

When the text transmission mode is not executed but the second body 120 is more slid, the first and second bodies 110 and 120 are placed at a fourth position at which the fourth position indication element 135 is recognized by the position recognizing unit 137. An operation mode corresponding to the fourth position, namely, an initial screen image of the music play mode, is outputted on the display 141. When an execution command of the control unit 150 or the user is transferred to the output unit 140, the display 141 executes playing of a music file as shown in FIG. 4E. Sounds according to the playing of the file are outputted through the speaker 143.

When the execution command is not transferred to the output unit 140, the image capture mode, the text transmission mode and the music play mode are sequentially outputted to the display 141 according to the positions of the first and second bodies 110 and 120. This means that the relatively sliding between the first and second bodies 110 and 120 achieves a scroll function with respect to the operation modes of the portable electronic device 100. In addition, the modes are sequentially displayed not only when the second body 120 is slid from the first position to the fifth position but also when the second body 120 is slid in the reverse direction.

In this manner, by combining the configuration for selecting the plurality of modes to the operation for opening and closing the portable electronic device 100, a desired operation mode can be immediately selected or executed while changing the portable electronic device 100 from the power saving mode to the standby mode. Accordingly, the user can simply and quickly perform the desired functions.

In addition, a hot key for selecting a particular mode does not need to be disposed at the function keys, so the function keys can be reduced in number or the existing function keys can be used for other purpose.

Figure 5:
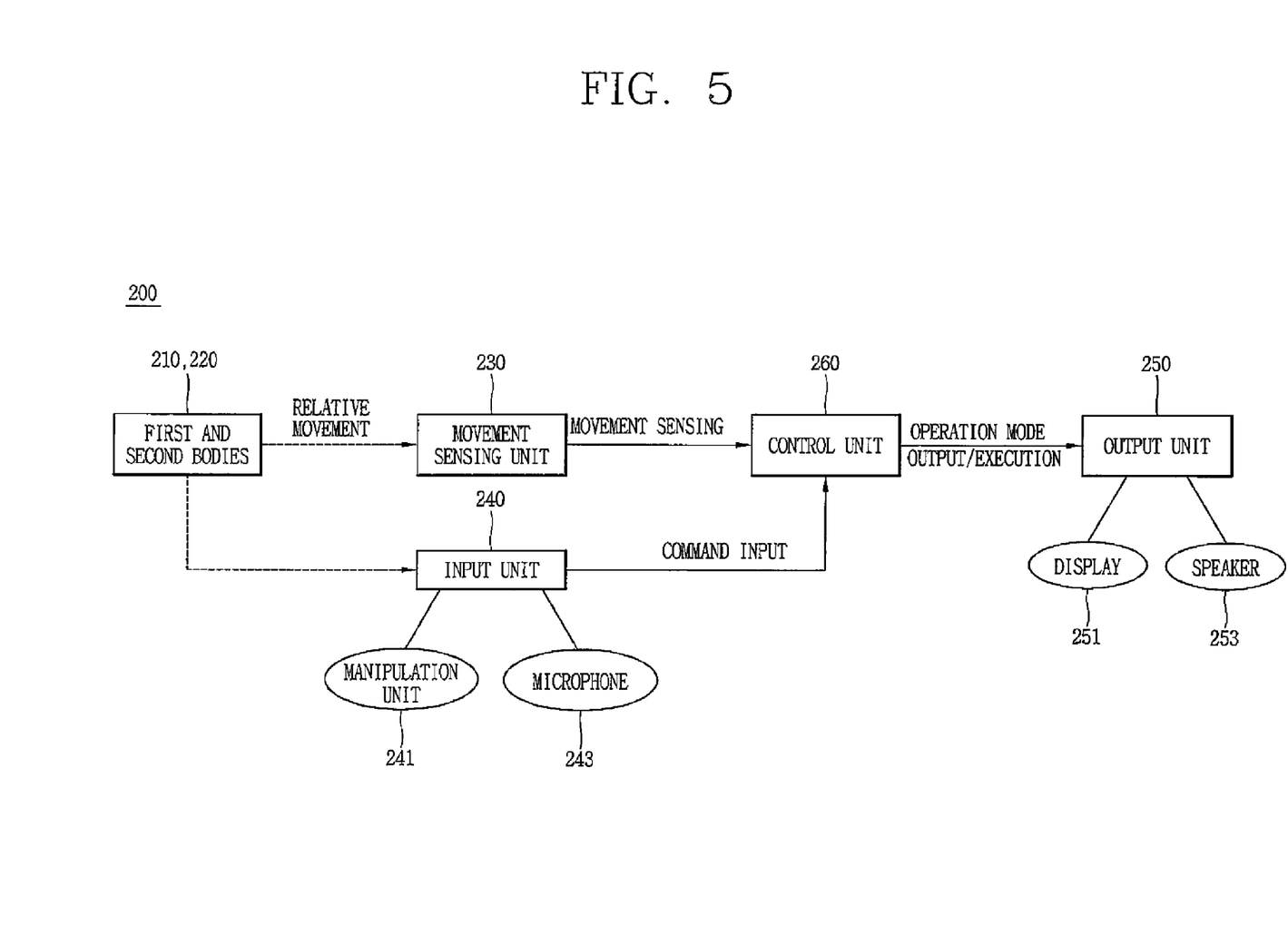
FIG. 5 is a conceptual view for explaining the construction of a portable electronic device according to a second exemplary embodiment of the present invention.
Figure 6:
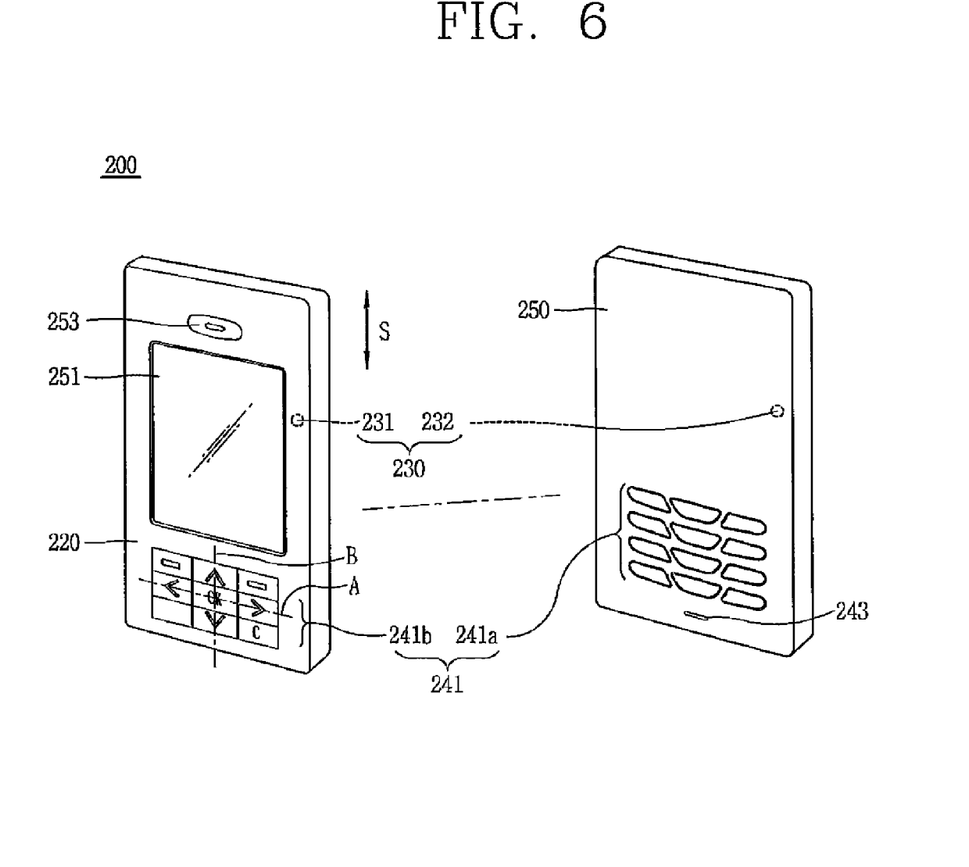
FIG. 6 is an exploded perspective view of the portable electronic device having the construction as shown in FIG. 5.

FIG. 5 is a conceptual view for explaining the construction of a portable electronic device according to a second exemplary embodiment of the present invention, and FIG. 6 is an exploded perspective view of the portable electronic device having the construction as shown in FIG. 5. In these drawings, the portable electronic device 200 is shown as a mobile terminal such as the portable electronic device 100 of the first exemplary embodiment of the present invention, but without being limited thereto, the portable electronic device 200 can be the PDAs or the mobile game player as mentioned above.

With reference to FIGS. 5 and 6, the portable electronic device 200 includes first and second bodies 210 and 220 that are slidably connected along the sliding direction S. The sliding between the first and second bodies 210 and 220, particularly, a movement from a closed state to an opened state (refer to FIG. 1) is sensed by a movement sensing unit 230.

The movement sensing unit 230 includes a indication unit 231 disposed at the second body 220 and a recognizing unit 232 disposed at the first body 210. For example, the indication unit 231 can be a magnet and the recognizing unit 232 can be a magnetic sensor. When the portable electronic device 200 is in the closed state, the indication unit 231 and the recognizing unit 232 are disposed at the mutually corresponding positions.

Information regarding a relative movement between the first and second bodies 210 and 220 sensed by the movement sensing unit 230 and a user command inputted by an input unit 240 are transferred to a control unit 260. The input unit 240 includes a manipulation unit 241 operated by user's pushing or touching and a microphone 243 that receives sounds. The manipulation unit 241 includes, for example, a keypad 241a disposed on the first body 210 and operated by pushing and a touch pad 241b disposed on the second body 220 and operated by touching.

Figure 7:
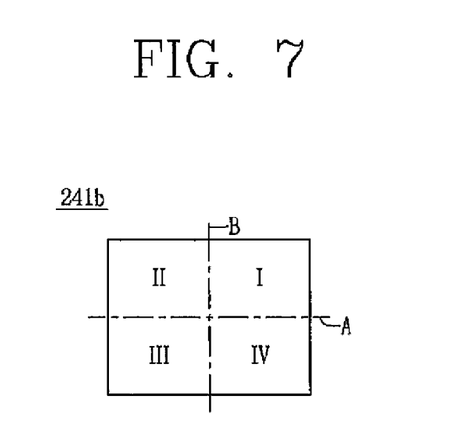
FIG. 7 is a front view for showing divided regions of a touch pad of FIG. 6.

As shown in FIG. 7, the touch pad 241b is divided into four regions I to IV by reference lines A and B. The regions I to IV include input parts through which each different command is inputted.

With reference to FIG. 5, the output unit 250 controlled by the control unit 260 outputs operation modes in an initial state before execution or in an executed state. The output unit 250 includes a display 251 and a speaker 253 disposed on a front surface of the second body 220.

The operation method of the portable electronic device 200 according to the second exemplary embodiment of the present invention will now be described as follows.

The portable electronic device 200 is in the closed state that the second body 220 is in a overlying stacked relation with the first body 210. When the user wants to use the mobile terminal 200, he/she slides the second body 200 in the sliding direction S so as to be in the opened state.

In this case, the user performs sliding with his/her thumb touching one of the regions I to IV of the touch pad 241b.

As the recognizing unit 232 of the movement sensing unit 230 fails to sense the indication unit 231, the control unit 260 recognizes the sliding movement. When the movement and inputting by touching on the touch pad 241b are made within a certain time interval, the control unit 260 executes an operation mode corresponding to the regions I to IV to output it through the output unit 250.

For example, when the user performs sliding while pressing/touching the first region 1, the image capture mode can be outputted through the display 251. When the user presses the second region 11, the text transmission mode is outputted to the display 251. The music play mode can be executed corresponding to the third region III and an Internet access mode can be executed corresponding to the fourth region IV. In addition, when the user performs sliding while simultaneously pressing two or more regions, a corresponding different mode can be executed.

With such a configuration, in sliding to change the portable electronic device 200 to the opened state, a desired operation mode can be immediately executed by simply pressing a particular region or regions of the input unit 240. When the touch pad 241b is employed as the input unit 240, the sliding can be easily performed by lightly touching the touch pad 241b. In addition, there is no need to install a hot key for immediately executing the operation modes at the manipulation unit 241, so the manipulation unit 241 can be advantageously used for other function.

Figure 8A:
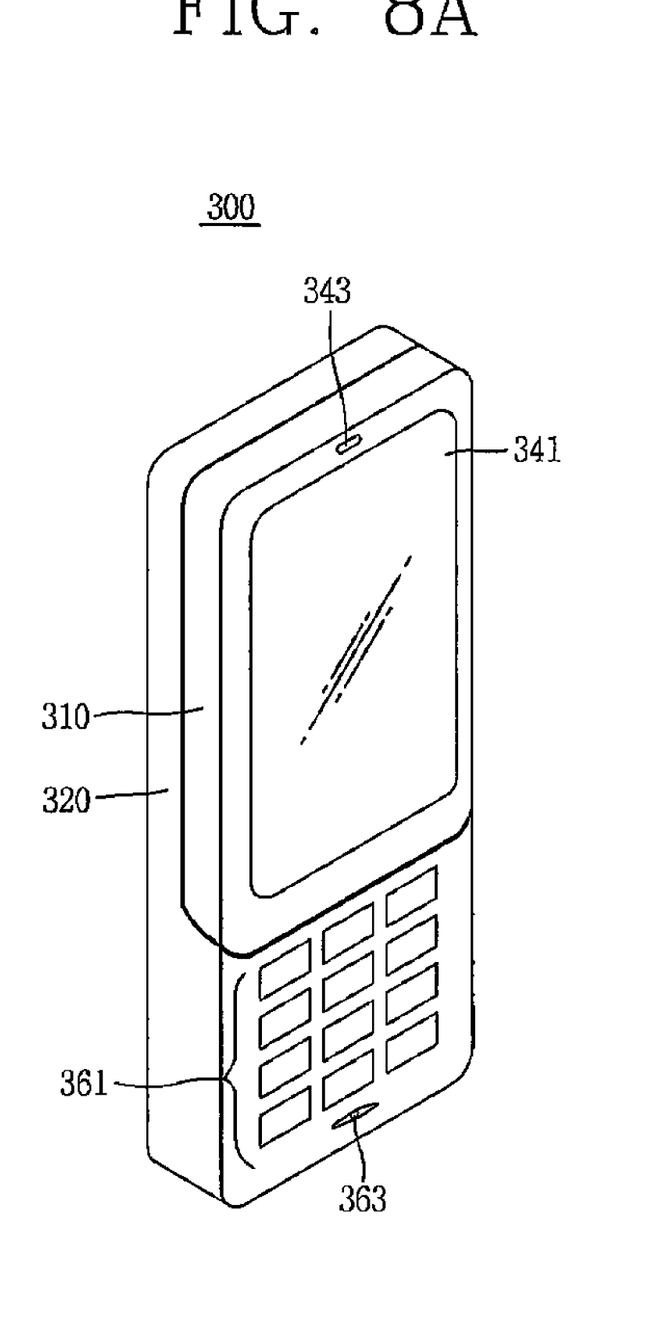
FIGS. 8A and 8B are perspective views showing an opened and closed state of a portable electronic device according to a third exemplary embodiment of the present invention respectively.
Figure 8B:
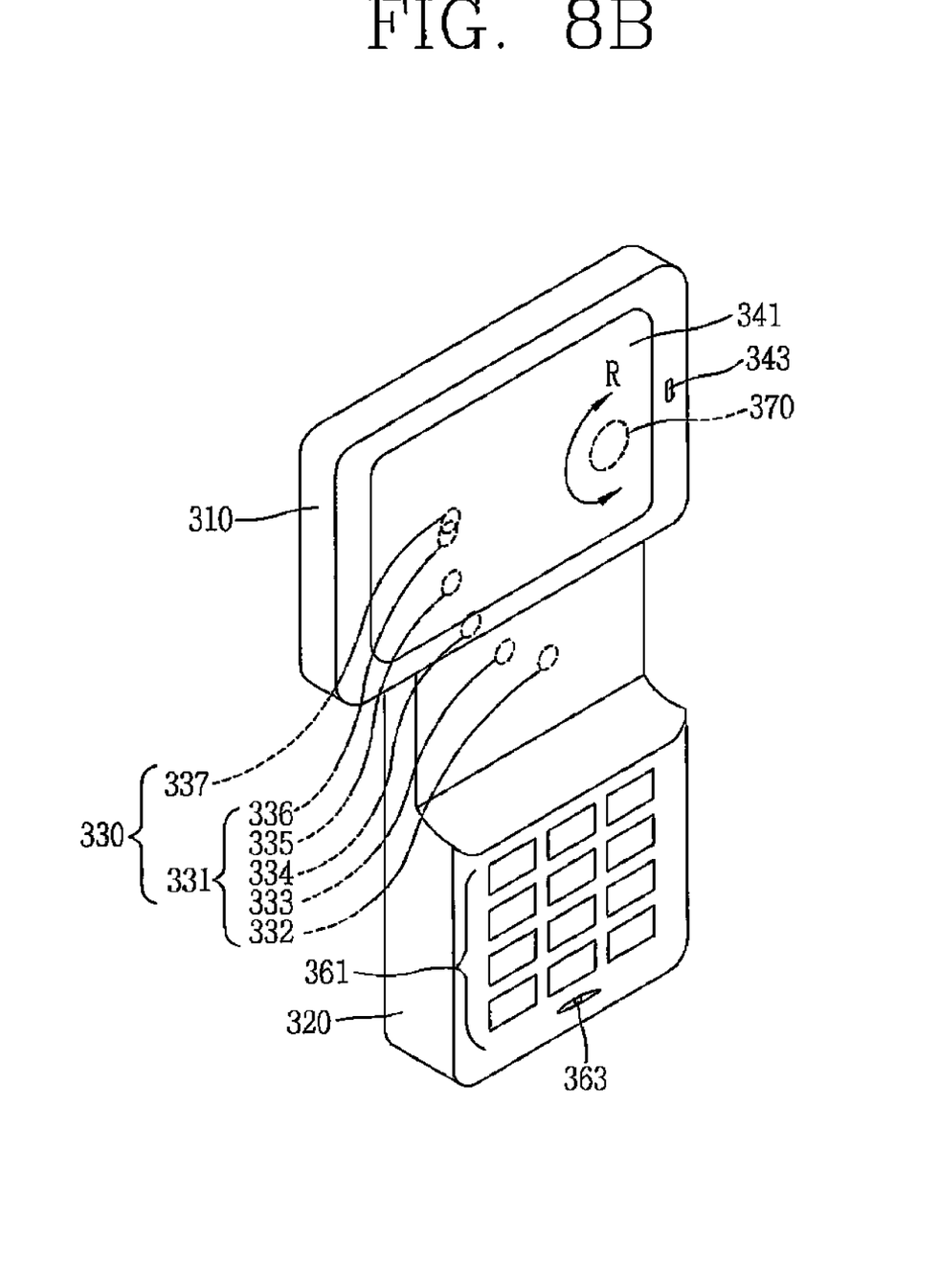

FIGS. 8A and 8B are perspective views showing the opened and closed state of a portable electronic device according to a third exemplary embodiment of the present invention respectively. The similar reference numerals are given to the similar elements to those in the first exemplary embodiment of the present invention and its description will be omitted.

The portable electronic device 300 is a swing type mobile terminal in which a second body 320 is rotated in one direction R centering around a swing hinge 370 as a rotational shaft in a state of facing the first body 310. Likewise as in the previous exemplary embodiments, the portable electronic device 300 is not limited to the mobile terminal.

In the portable electronic device 300, the position sensing unit 330 includes a position indication element 331 installed at the first body 310 and a position recognizing unit 337 installed at the second body. The position indication element 331 includes first to fifth position indication elements 332 to 336 disposed to form a circular arc corresponding to the rotation direction R. Accordingly, first to fifth positions between the first and second bodies 310 and 320 are recognized as the position recognizing unit 337 recognizes the position indication elements 332 to 336.

The operation method of the portable electronic device 300 is similar to that of the first exemplary embodiment of the present invention, so it can be sufficiently understood by the person skilled in the art without any additional explanation.

The portable electronic device 300 can be constructed according to the same method as that of the second exemplary embodiment of the present invention. With such a structure, the user can execute a desired operation mode by rotating the second body 320 with one hand while pressing a particular region of the manipulation unit 361 of the first body 310 with another hand. In this case, the rotating movement is sensed as the first position indication element 332 and the position recognizing unit 337 are operated in the similar manner as the movement sensing unit 230 in the second exemplary embodiment of the present invention.

In the third exemplary embodiment of the present invention, the selection of the operation modes is related to a relative movement for opening and closing the portable electronic device 300, so the user can simply select the operation modes of the portable electronic device 300. Thus, such hot key function as in the related art is not required.

According to the third exemplary embodiment of the present invention, it can be easily inferred by the person skilled in the art that the present invention can be applied to any type of portable electronic devices so long as they can perform relative movement (sliding, rotating, etc) between the two bodies.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A portable electronic device comprising:
    first and second bodies connected to be relatively movable;
    a movement sensing unit configured to sense a relative movement between the first and second bodies;
    an input unit mounted on one of the first and second bodies and receiving a command; and
    an output unit mounted on one of the first and second bodies and outputting an operation mode according to the command received during the relative movement of the first and second bodies,
    wherein the input unit is formed as a touch pad on one of the first and second bodies where the output unit is mounted, and
    the command is received when a touch on the touch pad and the relative movement of the first and second bodies are simultaneously performed.

2. The device of claim 1, wherein the movement sensing unit comprises:
    an indication element formed on at least one of the first and second bodies; and
    a recognizing unit formed on the other of the first and second bodies and recognizing the indication unit until the relative movement occurs.

3. The device of claim 1, wherein the input unit comprises at least one input part that receives at least one command corresponding to the input part.

4. The device of claim 3, wherein the first and second bodies are connected to be relatively slidable.

5. The device of claim 1, wherein the output unit further comprises a display mounted on at least one of the first and second bodies and visually displaying the executed operation mode.

6. The device of claim 1, wherein the portable electronic device comprises a mobile terminal having a wireless communication module.

* * * * *